UNITED STATES PATENT OFFICE.

JUSTUS WOLFF, OF WYKE, NEAR BRADFORD, AND RALPH BETLEY, OF WIGAN, ENGLAND.

IMPROVEMENT IN PRODUCTION OF COLORING MATTERS FROM ANILINE.

Specification forming part of Letters Patent No. 189,538, dated April 10, 1877; application filed January 23, 1877.

*To all whom it may concern:*

Be it known that we, JUSTUS WOLFF, of Wyke, near Bradford, consulting and engineering chemist, and RALPH BETLEY, of Wigan, England, analytical and consulting chemist, have invented Improvements in the Production of Coloring Matters from Aniline, of which the following is a specification:

This invention relates, first, to the production of a series of dyes obtained from aniline, or from aniline containing toluidine, either with or without the addition of xylidine and nitro-benzole or nitro-toluol, or of nitro-benzole containing nitro-toluol, or such combinations as may produce these desired mixtures, by the treatment of these mixtures with certain suitable metallic salts, such, for example, as protochloride of tin, either in crystals or in solution, as, for example, protochloride of tin, such mixtures, as hereinafter indicated, being submitted to a temperature of from about 190° to 220° Celsius for a sufficiently long period, in order to produce the desired coloring matters, and then effecting their extraction with water or with slightly-acidulated water at an elevated temperature, either in open vessels or under pressure, and then precipitating the coloring matters from solution, either with salt, caustic soda, or by other means.

If pure aniline and pure nitro-benzole be treated with protochloride of tin or other suitable metallic salts according to our invention, then a dye or dyes are obtained which are soluble in water, and which are capable of being employed for dyeing or printing upon wool, cotton, or other textile fabrics, such dye or dyes being of blue shades, and varying from grayish-blue to blackish-blue, and to darker shades.

If the aniline contains toluidine, and the nitro-benzole contains nitro-toluol, then the colors obtained by this invention will dye wool more or less bluish-black, pure black, reddish-black, and brownish-black, the color varying according to the quantity of toluidine and nitro-toluol contained in the mixtures.

In carrying out the first part of our invention, we give the following process as an example: First, we mix about three parts, by weight, of aniline with about two parts, by weight, of protochloride of tin in crystals, or the same amount of the salt in solution in water, and then add about one part, by weight, of nitro-benzole to the mixture. We then allow it to remain until the primary reaction is effected, and we then heat the mixture to about from 200° to about 220° Celsius, until a sample drawn out and dropped into boiling water communicates to the boiling water a brownish-yellow coloration. As soon as this point is reached the source of heat is then to be removed, and the resulting mass, melt, or product may be treated either by steam or otherwise, in order to remove the excess of aniline, and also any traces of diphenylamine and its homologues which may have been formed; or, in lieu of the before-mentioned treatment, it may be at once submitted to the following mode of extraction, which may be also adopted after having submitted the product to the action of steam. The melt is then submitted to the repeated action of water, or of acidulated water, at an elevated temperature, until the solution becomes colored—that is to say, until the dye produced becomes soluble. The solutions thus yielded will contain traces of color and tin salt, from which the oxide of tin can be recovered by precipitation with caustic soda. After this we boil the melt with water, or with slightly-acidulated water. The solution of the coloring matters thus obtained we then filter, and precipitate the coloring matter from it, either with salt or with caustic soda, or by any other means. The precipitate thus yielded is filtered off and dried, preferably with a small excess of hydrochloric or with any other suitable acid, and the coloring matters thus obtained are ready to be used for the purposes of dyeing or printing.

The first resulting product, mash, or melt, before it is steamed or after steaming, as well as the extracted dye, and the remainder or residue from this extraction, may be used for preparing varnishes of different shades or color.

The oxide of tin or other metal in the remainder or residue from the extractions may be recovered by any suitable means.

The second part of our invention consists, first, in the production of such coloring matters from what is known as "aniline" and "nitro-benzole," in conjunction with hydrochloric or other suitable hydrogen acid, such acid to be employed in such quantity as either to combine in part or entirely, or to unite with a portion or with the whole of the aniline employed.

In carrying out this first part of our invention, we take about three parts, by weight, of aniline, or of aniline containing toluodine, with about one part, by weight, of nitro-benzine, or of nitro-benzine containing nitro-toluine, and with about two to three parts, by weight, of hydrochloric acid, or of any other inorganic hydrogen acid capable of effecting the desired result.

We then heat this mixture to a temperature of about from 190° to about 240° Celsius, and continue the heat until what is known as the "melt" gives, upon a sample being submitted to the action of water, the desired coloration, such yellowish-brown coloration being indicative of the production of the desired result. Any excess of aniline remaining in the melt may be removed by steam or otherwise.

The melt is then submitted to the action of water at an elevated temperature, such water being either neutral, or, by preference, slightly acidulated, until the aqueous solution contains a coloration caused by the coloring matter contained in the melt becoming soluble, and the extraction by water is repeated until the whole of the soluble coloring matter is dissolved.

The solution of the coloring matter may then be filtered, and treated with saline matters, such, for example, as common salt or caustics, or carbonate of soda, so as to precipitate the dye; or the solution may be employed for the purposes of dyeing or printing. The precipitated coloring matter thus obtained may be redissolved in water, or in acidulated water, and is then suitable for the purposes of dyeing and printing.

Secondly, in the employment of aniline in conjunction with arsenic, such arsenic acid being employed in such proportion as that from about one-half to about two-thirds of the aniline employed shall be saturated.

In carrying out this second part of our invention, we prefer to employ the arsenic acid in a dry state or in solution, in about the proportion of one equivalent of arsenic acid to about from three to five equivalents of aniline. The mixture of aniline together with metallic oxygen acid, such, for example, as arsenic acid, is to be submitted to a temperature of about from 190° to about 220° Celsius, and when the melt gives, upon being submitted to the action of water, a yellowish-brown color, the application of heat is to be arrested, and the resulting melt is then to be treated in the manner previously described, and the coloring matters thus obtained may be employed, as indicated, for the purposes of dyeing and printing.

Instead of employing aniline, a salt of aniline, such, for example, as hydrochlorate of aniline, may be substituted.

The third part of our said invention relates to the production of a series of dyes from aniline, (with or without toluidine,) in the manner hereinafter described.

According to one mode of carrying out our invention, we mix, say, about three equivalents of aniline (with or without toluidine) with, say, from about two to three equivalents of any suitable acid, by preference hydrochloric acid; into this mixture we introduce in a stream, say, about one equivalent of chlorine gas; we add about one equivalent of bromine or iodine. The mixture thus obtained we heat to, say, from about 220° to 230° Celsius, until a sample drawn out and dropped into boiling water communicates to the latter a brownish-yellow tint. When it is ascertained that this effect is produced, the heating is continued at the temperature arrived at until a sample drawn out is found to yield up its coloring matter by repeated treatment with acidulated water at an elevated temperature. The source of heat is then removed, and from the melt the dye is separated by repeated extraction with water (preferably slightly acidulated with hydrochloric acid) at an elevated temperature, such extraction being repeated so long as coloring matter is dissolved. The coloring matter is precipitated from the filtered extraction-liquids by means of salts, or of soda, or of caustic alkalies, filtered off, dried, preferably with the addition of a little hydrochloric acid, and is then ready for use.

According to another mode of carrying out our invention, we mix, say, about three equivalents of aniline (with or without tolnidine) with, say, from about two or three equivalents of hydrochloric or other suitable acid, and we then add, say, about one equivalent of peroxide of manganese, or of peroxide of lead, or of any other suitable metallic oxide capable of producing an oxidizing effect in the process. We heat and treat this mixture until the reactions hereinbefore mentioned have taken place, and extract and precipitate the coloring matter in the manner hereinbefore described.

According to a further mode of carrying out our invention, we mix, say, from about six to seven equivalents of aniline (with or without toluidine) with, say, from six to seven equivalents of hydrochloric or other suitable acid, and we then add, say, about one equivalent of nitric acid, and subject this mixture to the treatment hereinbefore described; or we mix, say, from about six to seven equivalents of aniline (with or without toluidine) with, say, from about seven to eight equivalents of hydrochloric or other suitable acid, and add to the mixture, say, one equivalent of nitrate of soda, or of any suitable nitric-acid salt, or oxidizing nitrous-acid salt. The mixture thus obtained is subjected to the subsequent treatment for the production and precipitation of the coloring matter, as hereinbefore described;

or we mix, say, from about fourteen to fifteen equivalents of aniline (with or without toluidine) with, say, from about fourteen to fifteen equivalents of hydrochloric or other suitable acid, and add to the mixture, say, about one equivalent of chloric acid, or bromic acid, or iodic acid, or any suitable oxidizing compound of chlorine, bromine, or the like, with oxygen, or with one equivalent of the suitable salts of the acids and compounds, and these mixtures we subsequently treat in the manner hereinbefore described.

According to another modification of our process, we mix, say, about seven to eight equivalents of aniline (with or without toluidine) with, say, from about six to ten equivalents of hydrochloric or other suitable acid, and we then add slowly, say, about two equivalents of chromic acid in solution, or a quantity of a chromic-acid salt containing that amount of chromic acid, or any other suitable metallic-acid salt. The mixture is subsequently treated in the manner hereinbefore described, so as to obtain the coloring matters therefrom.

According to a further modification of our process, we mix, say, about three equivalents of aniline (with or without toluidine) with, say, from two to three equivalents of hydrochloric or other suitable acid, and add to the mixture, say, about two equivalents of copper perchloride, or any other suitable reducible metallic perchloride. The mixture thus obtained we subsequently treat in the manner hereinbefore described; or we mix, say, from about five to six equivalents of aniline (with or without toluidine) with, say, from two to four equivalents of hydrochloric or other suitable acid; and we then add to the mixture, say, about two equivalents of sulphate of copper, (or any other suitable oxidizing metallic oxysalt;) and we subsequently treat the mixture thus obtained in the manner hereinbefore described. The coloring matters produced according to this invention are soluble in water, or in acidulated water, and are capable of dyeing wool, cotton, and other fibers in dark shades—such, for example, as bluish-black and gray, violet-black and gray, and in all the different shades of black and gray. The less toluidine there is contained in the aniline used the bluer will be the black obtained; the more toluidine there is contained in the aniline the more violet or brownish or yellowish are the black and gray shades obtained, the shades thus varying according to the quantity of toluidine contained in the mixture.

We claim—

1. The production of a dye, or of a series of dyes, from aniline, or from toluidine, or from mixtures of the same, and either with or without the employment of xylidine, together with nitro-benzole or nitro-toluol, or mixtures of the same, in conjunction with metallic salts, as herein mentioned, in the manner and for the purposes as hereinbefore described.

2. The production of coloring matters from aniline, in conjunction with nitro-benzole, by the employment of hydrochloric acid, or of other suitable hydrogen acids, in the manner hereinbefore described.

3. The production of coloring matters from aniline by the employment of arsenic acid, or of other metallic oxygen acids, in the manner and for the purposes hereinbefore described.

4. The production from aniline, partially or completely neutralized or saturated by hydrochloric acid, or by any other suitable acid, and treated in the manner hereinbefore described, of coloring matters soluble in water, or in acidulated water, at an elevated temperature, the same being capable of dyeing various shades of black and gray on wool, cotton, and other fabrics.

In witness whereof we have signed our names to this specification in the presence of two subscribing witnesses.

JUSTUS WOLFF.
RALPH BETLEY.

Witnesses:
  WM. HY. WILLGOOSE,
  THOS. TABERNER,
    *Clerks to Mr. Byrom, Solicitor,*
        31 *King Street, Wigan.*